United States Patent [19]
Hosoda et al.

[11] 3,867,960
[45] Feb. 25, 1975

[54] FIVE-WAY REVERSING VALVE

[75] Inventors: Taisei Hosoda; Hideo Uzuhashi; Nobuyuki Kobayashi; Masaaki Tanaka, all of Tochigi-ken, Japan

[73] Assignee: Hitachi Ltd., Tokyo, Japan

[22] Filed: June 19, 1973

[21] Appl. No.: 371,570

[30] Foreign Application Priority Data
Nov. 15, 1972 Japan.............................. 47-113885

[52] U.S. Cl..... 137/625.6, 137/625.64, 137/625.29, 137/625.43, 62/324
[51] Int. Cl............................................. F16k 11/07
[58] Field of Search..... 137/625.29, 625.43, 625.64, 137/625.6; 62/324

[56] References Cited
UNITED STATES PATENTS

| | | | |
|---|---|---|---|
| 2,828,767 | 4/1958 | Barosch | 62/324 |
| 2,976,701 | 3/1961 | Greenawalt | 62/324 |
| 3,004,557 | 10/1961 | Wiegers | 137/625.29 |
| 3,180,347 | 4/1965 | Henderson | 137/625.64 X |
| 3,245,424 | 4/1966 | Olsen | 137/625.64 X |
| 3,646,851 | 3/1972 | Mohri | 137/625.64 X |
| 3,736,958 | 6/1973 | Rostad | 137/625.64 X |

FOREIGN PATENTS OR APPLICATIONS
913,211   2/1960   Great Britain................. 137/625.29

*Primary Examiner*—William R. Cline
*Attorney, Agent, or Firm*—Craig & Antonelli

[57] ABSTRACT

This five-way reversing valve is of the type whereby the flowing directions of two pressurized fluids can be changed at the same time and in which the valve function is performed by utilizing the pressure difference between the two pressurized fluids. According to the present invention, the flows of pressurized fluids are changed by combined operations of elastic pressing means in the form of a coil spring or its equivalent and valve adjusting means having a valve opening and closing function. Thus, there is provided according to the present invention an improved valve device which is extremely low in cost and operates surely with high reliability.

4 Claims, 6 Drawing Figures

FIVE-WAY REVERSING VALVE

BACKGROUND OF THE INVENTION

1. Field of the Invention

This invention relates to a valve device for changing the directions of at least two pressurized fluids which are usually pressurized to high pressures by a compressor, but in use of the present device it is not essential that both of the fluids are highly pressurized; the invention is also applicable where one of the pressurized fluids is at low pressure.

2. Description of the Prior Art

The conventional valve devices are mostly of a structure where a part of the pressurized operating fluid and both end faces of the valve plug are communicated by a conduit provided with a three-way valve and designed to perfectly prevent leakage of the pressurized fluid from both end faces of the valve plug. Therefore, such valve devices, as compared with the simple opening and closing type valves, are extremely expensive due to high cost of three-way valves and complicated mechanism for fluid leakage prevention.

SUMMARY OF THE INVENTION

The present invention relates to a five-way reversing valve in which the directions of fluids in passages, one passage being provided for a fluid highly pressurized by a compressor and another passage being provided for a lower pressure fluid than the first mentioned passage, can be reversed at the same time.

A primary object of the present invention is to obtain a five-way reversing valve comprising a plunger slidably arranged in a cylindrical body, chambers defined at opposite ends of the plunger, into which chambers a part of high pressure fluid flows through a clearance, a pipe operatively connecting one of said chambers to a passage for low pressure fluid, and spring means disposed in the cylindrical body for sliding said plunger toward the other chamber, thereby the right and left sliding movement of said plunger can be controlled merely by opening a two-way valve provided in said pipe so that with the five-way reversing valve of the present invention it is not necessary to use an expensive three-way valve for control.

A further object of the present invention is to obtain a five-way reversing valve comprising two auxiliary valves each independently disposed in the plunger, and pipes operatively connected to the cylindrical body in alignment, any two adjacent pipes being made to communicate with each other through the two auxiliary valves to provide a high pressure fluid passage by either one of said auxiliary valves while the auxiliary valve defining a high pressure fluid passage is forced to move radially inwardly within the plunger during sliding movement thereof so that the friction between the auxiliary valve and cylindrical body is decreased, thereby increasing the life of the auxiliary valves.

The other objects and features of the present invention will become apparent from a consideration of the following detailed description of an embodiment of the invention as adapted to a refrigerator and illustrated in the accompanying drawings.

DESCRIPTION OF THE PREFERRED EMBODIMENTS

Figure 1:
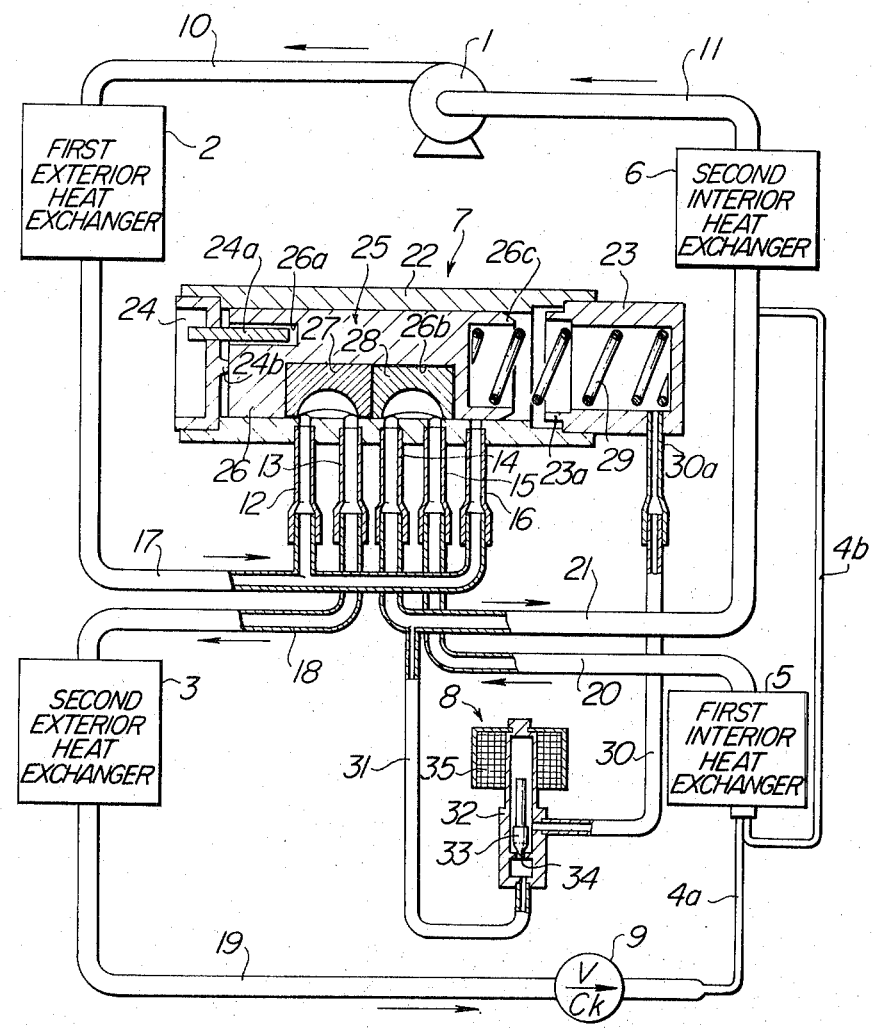
FIG. 1 shows a refrigerating cycle in cooling operation, where a valve device according to the present invention is incorporated.
Figure 2:
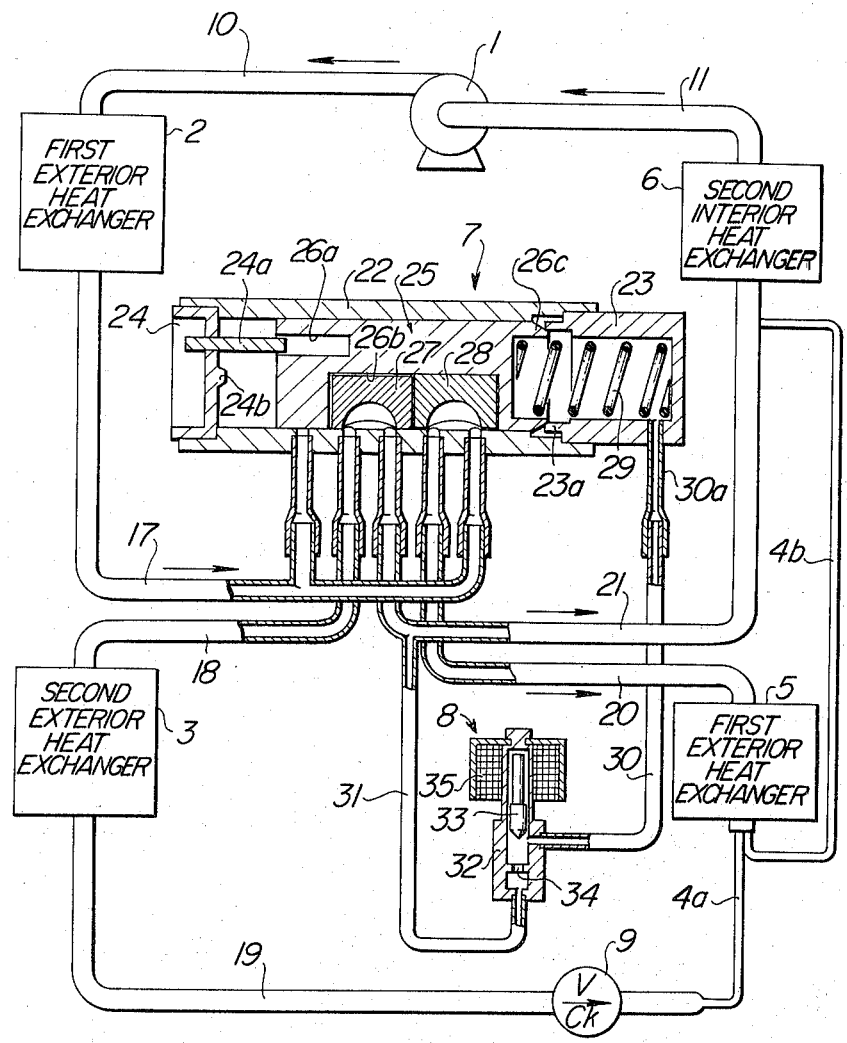
FIG. 2 is a view of the refrigerating cycle of FIG. 1 in dehumidifying operation.
Figure 3:
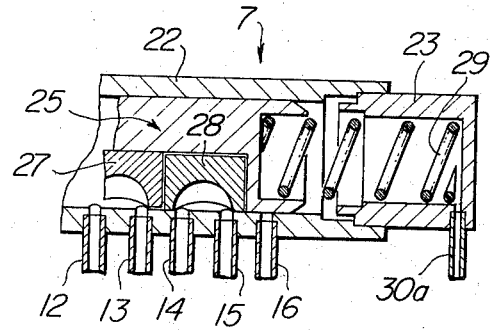
FIG. 3 is a partial sectional view of an embodiment different from that of FIGS. 1 and 2.

Referring first to FIGS. 1 and 2 of the drawings, it will be seen that the discharge side of the compressor 1 is connected to a first exterior heat exchanger 2 by a discharge pipe 10 while the inlet side of said compressor is connected to a second interior heat exchanger 6 by an induction pipe 11. Said first exterior heat excahnger 2, which functions as a part of a condenser, is connected into the valve mechanism 7 through a conduit 17 and a first and fifth coolant pipes 12 and 16. The second exterior heat exchanger 3, designed to function as a condenser during the cooling operation, is connected into the valve mechanism 7 through a conduit 18 and a second coolant pipe 13, the other end of said second exterior heat exchanger 3 being connected to a first capillary tube 4a with a suitable degree of resistance through a conduit 19 and a check valve 9, said capillary tube 4a being connected to an end of a first interior heat exchanger 5, the other end of which is connected into the valve mechanism 7 through a conduit 20 and a fourth coolant pipe 15 as shown. The second interior heat exchanger 6 is communicated with the valve mechanism 7 through a conduit 21 and a third coolant pipe 14. Also, a second capillary tube 4b connects between the first interior heat exchanger 5 and second interior heat exchanger 6.

The valve mechanism 7 is formed from a cylindrical body 22, a spring case 23 and a cover 24 which are welded together into an integral unit. The cover member 24 is U-shaped in cross-section. This configuration proves effective in inhibiting ingress of alien substances into the inside of the system during the welding operation and also in minimizing heat capacity of the welding end. This permits reduction of the weld time and prevention of an abnormal rise in temperature in the valve mechanism 7. The interior of the valve mechanism 7 is hermetically sealed except for the piping arrangement and is formed into a cylindrical tubular chamber. At the juncture between the cylindrical body 22 and spring case 23 is internally formed a stepped portion 23a which abuts against one end of the valve plug to be discussed later. The valve cover 25 consists of a plunger 26 and a pair of auxiliary valves 27 and 28. Said plunger 26 is configured substantially conforming to the cylindrical tubular chamber so that it can fit in said chamber. Said plunger 26 is also slidable axially of the valve mechanism 7. The axially slidable arrangement of the plunger 26 permits employment of a more simple structure than a system where the coolant flow is changed by rotating the plunger 26. For example, elastic pressing or force exerting means may be provided by merely placing a coil spring in the valve mechanism. Between the contacting faces of said plunger 26 and cylindrical body 22 is formed a small space through which the coolant leaks to allow normal valve functioning. The cylindrical configuration of the cylindrical body 22 and plunger 26 permits easier manufacture than the valve mechanisms of other shapes. It also allows improvement of dimensional accuracy with ease. A recessed groove 26a is formed extending from one end or side of the plunger 26, and a guide bar 24a secured to the cover 24 is inserted into said groove 26a to hold the plunger 26 against rotation. This makes it possible to arrange in a same line the first to fifth coolant pipes 12 to 16 which lead into the valve mechanism 7. The first to fifth coolant pipes are arranged in one line longitudinally of the cylindrical body 22. This one-line arrangement of the coolant pipes 12 to 16 can extremely simplify the pipe welding operations and can also minimize the restriction to the space for use after assemblage. For instance, the device can be used with one side of the valve mechanism 7 contacting a wall or the like. The two auxiliary valves 27 and 28 are preferably made of synthetic resin such as nylon, phenol or polyester so that they will have high heat resistance, small coefficient of friction and sufficient strength. These auxiliary valves 27, 28 are loosely fitted in a recess 26b in the plunger 26. They face against the cylindrical body 22, and each of them is designed to communicate two adjoining pipes of the coolant pipes 12 to 16. The elastic pressing or force exerting means 29 formed by coiling a piano wire or the like is disposed between one side of the plunger 26 and the spring case 23, and its elastic force is set weaker than the operating force produced by pressure difference in the tubular chamber as will be discussed later. Around one side edge of the plunger 26 is provided a flange 26c of which the end portion is tapered to hit against said stepped portion 23a. Because of such hitting contact, the plunger 26 is preferably made of a material harder than the material of the spring case 23. A still better result is obtained by previously performing sheet punching on the stepped portion 23a. Contact between plunger 26 and spring case 23 greatly influences the coolant leakage, and hence it is important to keep such contact constant. The cover 24 is formed with a protuberance 24b designed to provide a space between the other side of plunger 26 and cover 24. This is important when a high pressure coolant enters the other side of said plunger 26.

The valve adjusting mechanism 8 is communicated with a tubular chamber adjoining one side of the plunger 26 of the valve plug 25 through conduits 30 and 30a. It is also connected to the conduit 21 through a conduit 31. The conduit 31 is normally connected to the low pressure side. In the illustrated embodiment, the "low pressure side" is the outlet side of the first capillary tube 4a or the second capillary tube 4b, but actually, such low pressure side may be any section where the pressure is lower than the coolant pressure in the first coolant pipe 12 such that a difference will be produced between the pressures in the two tubular chambers adjoining both sides of the plunger 26. In the cylindrical body 32 of said valve adjusting mechanism 8 is provided a plunger 33 arranged vertically movable to perform an opening and closing action relative to a seat 34 thereof. The vertical movement of said plunger 33 is effected by a solenoid coil 35.

Figure 4:
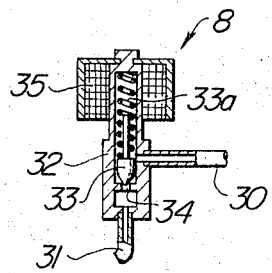
FIG. 4 is a sectional view of a valve adjusting means in an embodiment different from that of FIGS. 1 and 2.

In performing the cooling operation with use of the above-described system, first the operation of compressor 1 as well as the operation of air blower (not shown) are stopped, and at the same time power to the solenoid coil 35 in the valve adjusting mechanism 8 is stopped, whereupon the plunger 33 is caused to fall down by its own weight to contact the seat 34, thereby closing communication between the conduits 31 and 30. Provision of spring means 33a to said plunger 33 as shown in FIG. 4 can further ensure positive contact between said plunger 33 and its seat 34. The valve adjusting mechanism 8 may be disposed vertically or with inclination in the lateral direction. As the fluid passage in the valve adjusting mechanism 8 is closed, the tubular chamber contacting the other side of the plunger 26 in the valve mechanism 7 is filled with high pressure coolant which leaks thereinto from the fifth coolant pipe 16 and further through a space between the plunger 26 of the valve plug 25 and the cylindrical body 22 of the valve mechanism 7. Since the tubular chamber contacting one side of the plunger 26 is filled with high pressure coolant from the beginning, the difference of coolant pressure between the two tubular chambers on both sides of the plunger 26 is eliminated. Consequently, the plunger 26 is slidingly forced back by the restorative force of the elastic means 29 until said plunger abuts against the protuberance 2b of the cap 24. The sliding movement of said plunger 26 causes corresponding sliding movement of the two auxiliary valves 27 and 28 to communicate the first and second coolant pipes 12 and 13 until they are stopped at the position where the third and fourth coolant pipes 14 and 15 are communicated. High pressure coolant pressure is applied to one of said auxiliary valves 27 or 28. They are not contacted with the cylindrical body 22 and hence suffer little wear.

The coolant circulates through the course of: compressor 1 — first exterior heat exchanger 2 — second exterior heat exchanger 3 — check valve 9 — first capillary tube 4a — first interior heat exchanger 5 — second interior heat exchanger 6 — compressor 1, to perform the cooling in a known way. Since the high temperature high pressure coolant from the conduit 17 is beforehand branched off into the first and fifth coolant pipes 12 and 16, the structure of the valve mechanism 7 is simplified.

In performing the dehumidifying operation, power is connected to the solenoid coil 35 to energize it to raise up the plunger 33, communicating the conduits 30 and 31. Whereby the tubular chamber adjoining one side of the plunger 26 in the valve mechanism 7 is communicated with the low pressure conduit 21 and rendered into a low pressure condition. Consequently, a pressure difference is produced on both sides of the plunger 26 to develop an operating force that acts against the plunger 26. As this operating force is greater than the springing force of the elastic pressing means, the plunger 26 forces back said elastic means 29 and moves slidingly until the tapered portion of its flange 26c comes to abut against an end of the stepped portion 23a of the spring case 23. This also causes the sliding movement of the two auxiliary valves 27 and 28 to communicate the second and third coolant pipes 13 and 14 until they are stopped at the position where the fourth and fifth coolant pipes 15 and 16 are communicated.

The coolant circulates through the course of: compressor 1 — first exterior heat exchanger 2 — first interior heat exchanger 5 — second capillary tube 4b — second interior heat exchanger 6 — compressor 1, to perform the scheduled dehumidifying operation. During this operation, the coolant entering into the valve mechanism 7 from the first and fifth coolant pipes 12 and 16 leaks out in a small amount through the space between plunger 26 and cylindrical body 22 and also through the space between the flange 26c of plunger 26 and stepped portion 23, and such leaked coolant passes through the conduit 30 to enter the cylindrical body 32 in the valve adjusting mechanism 8. The coolant which has entered the cylindrical body 32 is expanded to suck up heat from the surrounding, thereby effecting cooling of the solenoid coil 35, and then returns into the third coolant pipe 14.

As apparent from the foregoing discussion, according to the present invention there is no need of providing a costly and complicated three-way valve in the valve adjusting means 8, it sufficing to provide merely a simple opening-and-closing type valve, so that a sizable reduction of manufacturing cost is permitted. Further, the valve mechanism 7 requires no complicated leak preventive means but merely necessitates use of a simple elastic pressing means 29, thus allowing an appreciable reduction of manufacturing cost of the valve mechanism 7 itself. Of course the valve device according to the present invention operates surely with high reliability and can be also manufactured on a mass production scale.

Figure 5:
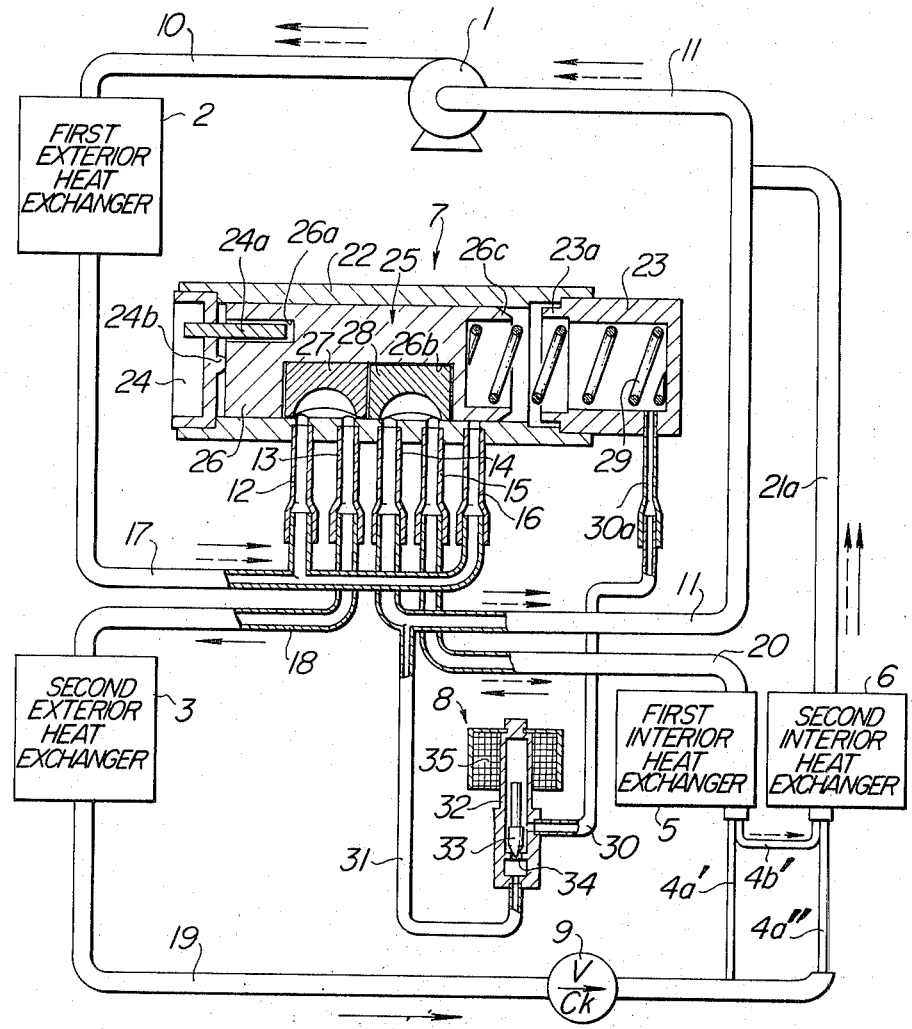
FIG. 5 is an illustration of a different refrigerating cycle adapted with a valve device according to the present invention.

The valve device according to the present invention can be incorporated in a refrigerating cycle, such as shown in FIG. 5, in which the first and second interior heat exchangers 5 and 6 are connected to each other by a first and a second cooling capillary tubes 4a' and 4a'' and also connected to the system by a conduit 21a, such that the coolant will flow through said both first and second interior heat exchangers in parallel flows during the cooling operation. According to this arrangement, the low temperature coolant passing through the pipes 14 and 15 is reduced by the amount of flow through the second interior heat exchanger 6, as compared with the refrigerating cycle shown in FIG. 1, and hence pressure loss in the valve device can be reduced such much. Shown in FIG. 5 is a situation in the cooling operation, with the coolant circulation being indicated by solid-line arrows. In the dehumidifying operation, the valve device operates in the same manner as illustrated in FIG. 2, with the coolant circulating as shown by dotted-line arrows in FIG. 5. The refrigerating cycle in the dehumidifying operation functions perfectly same as in the case of FIG. 2.

Figure 6:
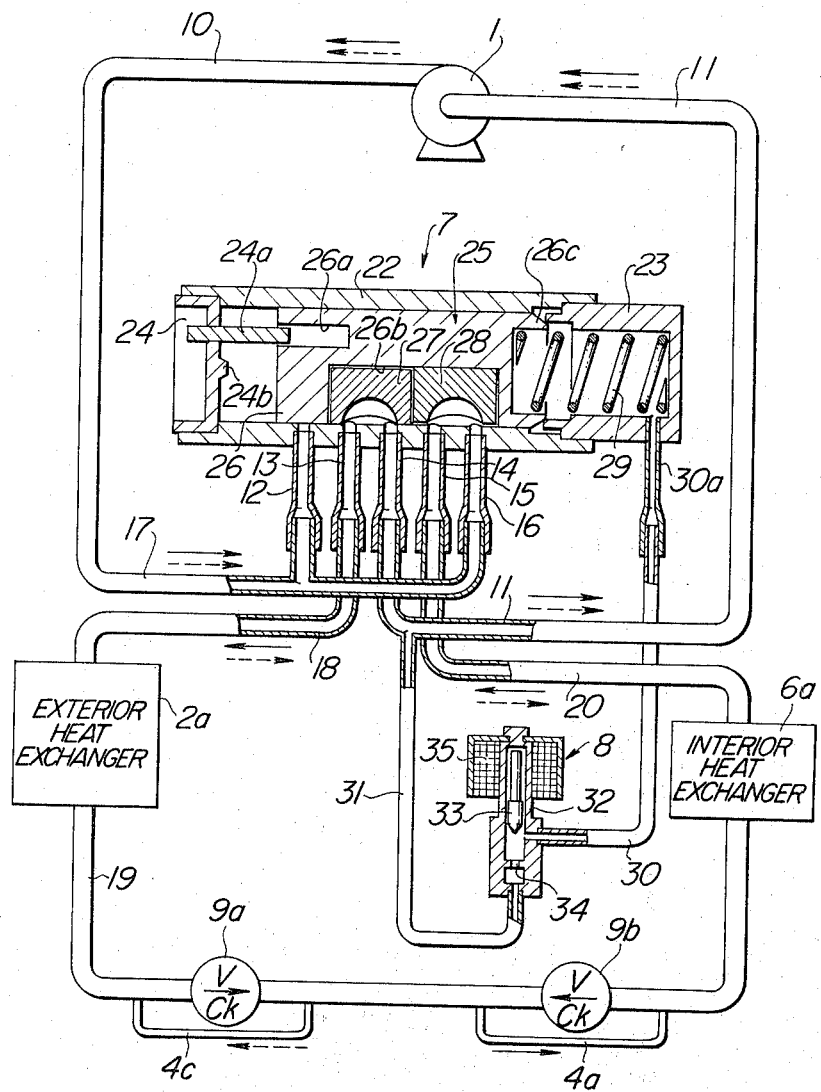
FIG. 6 is an illustration of still another different form of refrigerating cycle incorporated with a valve device according to the present invention

The valve device of the present invention can be also incorporated in a refrigerating cycle capable of switching from cooling to heating pattern or from heating to cooling patter, such as shown in FIG. 6. In this refrigerating cycle, the coolant flow through the exterior heat exchanger 2a and the interior heat exchanger 6a is reversed when the operating pattern is switched from cooling to heating or from heating to cooling. To this end, two check valves 9a and 9b are provided between said both heat exchangers, with cooling capillary tube 4a and heating capillary tube 4c being provided in parallel relation to said check valves 9a and 9b, respectively.

What is claimed is:

1. A five-way reversing valve comprising:
   a cylindrical body;
   a cover secured to said body in a fluid-tight manner to close one end of said body;
   a spring casing secured to said body in a fluid-right manner to close another end of said body;
   five pipes connected to said body and being axially aligned along said body, said pipes communicating with the interior of said body;
   a first of said pipes being disposed nearest said cover and the fifth of said pipes being disposed nearest said spring casing, the remaining three of said pipes being disposed between the first and fifth pipes;
   plunger means slidably received within said body and provided with a concave portion formed thereon, the ends of said plunger means and said cover and spring casing defining tubular chambers in said body;
   a clearance being defined between said plunger means and said body through which high pressure fluid leaks into the tubular chambers provided at both ends of said plunger means;
   spring means provided in said spring casing for biasing said plunger means toward said cover;
   a pipe connected to said spring casing and communicating with the interior of said spring casing and, through passage means, with the low pressure side of said valve;
   a valve controlling mechanism located between said passage means for opening and closing said passage means; and
   auxiliary valves loosely and independently received in said concave portion in said plunger means in such manner that each of said five pipes can be in change-over communication with an adjacent pipe of said five pipes by means of said auxiliary valves.

2. A five-way reversing valve according to claim 1, wherein said first and fifth pipes are high-pressure coolant fluid conduits.

3. A five-way reversing valve according to claim 2, wherein said auxiliary valves are made of high polymer material.

4. A five-way reversing valve according to claim 1, wherein the end of said plunger means facing said spring casing has a tapered corner portion and the inner face of said spring casing has a stepped portion such that the corner portion will abut against said stepped portion in one position of said plunger means.

* * * * *